United States Patent Office 3,232,996
Patented Feb. 1, 1966

3,232,996
PURIFICATION OF BUTYNEDIOL
David E. Graham, Westfield, Winfred C. Craig, West Long Branch, and Eugene V. Hort, Westfield, N.J., assignors to General Aniline & Film Corporation, New York, N.Y., a corporation of Delaware
No Drawing. Filed Dec. 29, 1960, Ser. No. 79,134
3 Claims. (Cl. 260—637)

This invention relates to the purification of 2-butyne-1,4-diol, hereinafter referred to as butynediol, and more particularly to the purification of butynediol containing formaldehyde as an impurity Butynediol is well known and has been commonly manufactured by the reaction of acetylene with aqueous formaldehyde solution over a suitable catalyst. The effluent solution is concentrated and by-product propargyl alcohol distilled out. The butynediol produced in this manner always contains relatively substantial amounts of formaldehyde impurity ranging up to about 2 to 3% by weight of the butynediol. A typical product contains about 35% butynediol and 0.2 to 0.6% formaldehyde impurity. However, in the commercial manufacture of butynediol from formaldehyde and acetylene, it has been found to be often desirable to leave an unreacted formaldehyde content of at least 3% or more (by weight of the butynediol) in order to increase the throughput of butynediol. In such instances, a typical product containing 35% butynediol will contain about 1% or more of formaldehyde impurity. The presence of the formaldehyde is, for many purposes and uses, highly undesirable. In the catalytic hydrogenation of butynediol to butanediol or butenediol, the presence of formaldehyde in the butynediol results in a lower quality, stability and yield of hydrogenated product, a lower catalyst life, etc.

In the copending application of Eugene V. Hort, Serial No. 781,948 filed December 22, 1958, now U.S. Patent No. 2,993,078 dated July 18, 1961, there is disclosed and claimed a process for purifying butynediol containing formaldehyde as an impurity comprising adding thereto an amount of an alkaline substance such as an alkali metal hydroxide or alkaline earth metal hydroxide sufficient to reach an alkaline pH of more than 7 and maintaining the butynediol under such alkaline conditions until the desired reduction in formaldehyde content is obtained. Although this provides a simple, economical method for purification of butynediol, it has certain limitations. The use of too much alkali results in lowered yields while too little alkali may not remove a sufficient amount of formaldehyde. In addition, the process often requires an extended period of time for treatment with the alkali.

In the copending application of David E. Graham and Eugene V. Hort, Serial No. 79,171, entitled, "Purification of Butynediol," filed on even date herewith, now Patent 3,129,252, there is disclosed and claimed an improved process for purifying butynediol containing formaldehyde as an impurity, the improvement residing in carrying out the alkaline treatment of the impure butynediol in the presence of a Raney-type nickel catalyst carrying about 3 to 25% of copper by weight of the catalyst.

While the processes in both the above identified copending applications are effective for reducing the content of formaldehyde impurity in the butynediol, it has been found that when the impure butynediol contains about 3% or more of formaldehyde by weight of the butynediol, the resulting purified butynediol is somehow deleteriously affected whereby the yields obtained by hydrogenation thereof to butanediol are markedly decreased.

It is an object of this invention to provide a purifying process which will not be subject to the above disadvantages. It is another object of this invention to provide an improved process for removing, destroying or nullifying the effect of formaldehyde impurity in butynediol containing the same. A further object of this invention is the provision of an improved process for purifying butynediol containing at least 3% formaldehyde impurity by weight of the butynediol without damage or detriment to the butynediol. Still another object of this invention is to provide an improvement over the processes disclosed and claimed in said copending applications. Other objects and advantages will appear as the description proceeds.

The attainment of the above objects is made possible by the present invention which broadly comprises a process for purifying 2-butyne-1,4-diol in liquid form and containing formaldehyde as an impurity comprising admixing such impure liquid 2-butyne-1,4-diol with an amount of an alkaline substance selected from the group consisting of alkali metal hydroxides and alkaline earth metal hydroxides less than about 0.25 mole per mole of formaldehyde impurity but sufficient to yield a pH within the range of about 7.5 to about 11 and then gradually adding more of said alkaline substance to the mixture to maintain the pH within said range and until the desired reduction in formaldehyde content is obtained.

The process of this invention has been found to be surprisingly effective in producing a purified butynediol which may be hydrogenated to butanediol in good yields. The process also surprisingly enables the use of an amount of alkali substantially less than the one-half mole per mole of formaldehyde impurity theoretically required for the Cannizarro reaction between the formaldehyde and alkali.

In carrying out the process of this invention, the impure butynediol is initially admixed with less than one-half the theoretical amount of said alkaline substance required for the Cannizarro reaction (less than about 0.25 mole per mole of formaldehyde) but the amount should be sufficient to yield a pH within the range of about 7.5 to about 11 and preferably 8 to 10.5. This initial amount may be as little as 0.05 mole per mole of formaldehyde impurity.

Following this initial admixture, the alkalinity of the resulting solution gradually tends to decrease as the alkali reacts with the formaldehyde, and additional alkaline substance is incrementally or gradually added to maintain the pH within the above mentioned range. This gradual further addition of alkaline substance may be terminated at any point when the desired reduction in formaldehyde content is obtained. A maximum reduction in formaldehyde content is obtained by continued gradual addition of alkali until the pH remains in said range without further addition of alkali. Even with such maximum reduction in formaldehyde content, the use of the present method often enables the use of less than about half and down to about one quarter or less of the amount theoretically required to remove all the formaldehyde impurity in the initial impure butynediol by the Cannizarro reaction.

As the alkaline substance employed in the present process, water soluble inorganic alkaline hydroxides such as sodium hydroxide, or potassium hydroxide are preferred. Any other alkali metal or alkaline earth metal hydroxide may be employed such as the hydroxides of lithium, magnesium, barium, and strontium and the like.

The temperature of treatment is preferably from about 80 to 110° C., although any temperature from room temperature to the boiling point of the mixture is effective. However, at decreasing temperatures below the preferred range, the rate of reduction in formaldehyde content of the butynediol diminishes, so that at room temperature the purification process may require several days. Temperatures above the preferred range may in some instances lead to side reactions.

The butynediol containing formaldehyde impurity is in liquid form, most advantageously in the form of a crude aqueous solution, usually in about 35% butynediol concentration as produced by the catalytic reaction of acetylene with aqueous formaldehyde solution. However, the present process is also applicable for the treatment of aqueous or organic solvent solutions of such impure butynediol in concentrations ranging from 15% or less up to 60% or more by weight. Thus, the butynediol containing formaldehyde as an impurity may be in the form of its solution in an organic solvent such as a monohydric alcohol, for example, ethyl, isopropyl, butyl or amyl alcohol, or a glycol such as ethylene glycol, propylene glycol, hexanediol, or preferably butanediol. The use of butanediol as a solvent is particularly advantageous when the purified butynediol produced by the process of this invention is to be subsequently completely hydrogenated to butanediol, since the butynediol solution produced hereby may be directly hydrogenated to produce a unitary product requiring no separation of solvent.

It will be understood that although the present process is particularly effective for purifying butynediol containing at least 3% of formaldehyde impurity by weight of the butynediol, it is also effective for purifying butynediol containing lesser amounts of such impurity. Butynediol has a multitude of known uses. It is an effective corrosion inhibitor in acid pickling of iron. As a glycol, it is readily etherified and esterified. Many addition reactions can be carried out at its acetylenic linkage. The purified butynediol produced by the process of this invention may be readily hydrogenated by the processes disclosed and claimed in U.S. Patents 2,950,236 and 2,953,605 and in the copending application of Hort and Graham, Serial No. 783,717 filed December 30, 1958, now Patent 2,967,893. The resulting butanediol is a solvent, plasticizer, moisture, etc., in addition to being a reactive glycol useful in the production of polyesters and the like.

The following examples are only illustrative of this invention and are not to be regarded as limitative. All parts and proportions referred to herein and in the appended claims are by weight unless otherwise indicated.

Example 1

To a solution of approximately 35% crude aqueous butynediol containing 1.5% formaldehyde was added 65 millimoles of NaOH per mole of butynediol present. The solution was heated for 3 hours at 95° C. to reduce the formaldehyde concentration. The amount of caustic is ca. 5% more than theoretically required for the Cannizarro reaction to remove the formaldehyde.

To 1450 g. (6.0 moles) of the above purified butynediol solution was added 12 g. of copper acetate and the solution was adjusted to pH 8.5 with sodium hydroxide. To this slurry was added 48 g. of a 50% aqueous Raney nickel paste. The material was charged into a 1 gallon stirred autoclave and hydrogenated to completion at 50° C. and 300 p.s.i.g. (pounds per square inch gauge, hydrogen pressure). This required about 2 hours. It was then held at 120° C. and 300 p.s.i.g. for 3 hours, cooled and discharged.

After the first run the catalyst was reused under the same conditions for a series of runs using the same purified butynediol. The butanediol was isolated from each run by decantation and filtration from the catalyst, followed by vacuum distillation. The resultant butanediol was analyzed for purity by solidification point (S.P.) and carbonyl (mg. KOH/g. of sample). The quality of the butanediol was up to standard but the yield was low. The results are tabulated below:

| Catalyst Use | Distilled Product | | |
|---|---|---|---|
| | Yield Percent of Theory | S.P., ° C. | Carbonyl Number |
| 1st | 81 | 19.1 | 0.65 |
| 2nd | 78 | 19.1 | 1.72 |
| 3rd | 77.5 | 19.1 | 1.53 |
| 4th | 77.5 | 19.1 | 1.78 |
| 5th | 80 | 19.1 | 0.31 |
| 6th | 81 | 19.1 | 0.31 |
| 7th | 80 | 19.1 | 0.49 |

Example 2

To the same solution of crude aqueous butynediol as employed in Example 1 was added 13 millimoles of NaOH per mole of butynediol present. The solution was heated for 3 hours at 95° C. During this heating period an additional 10–11 millimoles of NaOH per mole of butynediol present was added incrementally, maintaining pH at 8–10, to reduce the formaldehyde concentration. The total amount of caustic added is less than theoretically required for the Cannizarro reaction to remove the formaldehyde.

The resultant purified butynediol solution was hydrogenated as in Example 1. Both the quality and yield of distilled butanediol obtained were up to standard. The results are tabulated below:

| Catalyst Use | Distilled Product | | |
|---|---|---|---|
| | Yield Percent of Theory | S.P., ° C. | Carbonyl Number |
| 1st | 87.5 | 19.1 | 0.83 |
| 2nd | 90 | 19.1 | 0.67 |
| 3rd | 90 | 19.1 | 0.67 |
| 4th | 90.5 | 19.1 | 1.65 |
| 5th | 89.5 | 19.1 | 1.65 |
| 6th | 89.0 | 18.9 | 2.12 |
| 7th | 90 | 18.8 | 1.7 |

Example 3

The process of Example 1 was repeated, except, that the initial alkaline purification pretreatment was carried out in the presence of 4 g. per mole of butynediol of a copper-modified Raney-type nickel catalyst in the manner described and claimed in said copending application of Graham and Hort, Serial No. 79,171 entitled, "Purification of Butynediol," filed on even date herewith. The yield of distilled butanediol was only 75% of theory.

This invention has been disclosed with respect to certain preferred embodiments, and there will become obvious to persons skilled in the art various modifications and variations which are intended to be included within the spirit and scope of this invention.

We claim:

1. A process for purifying an aqueous solution of 2-butyne-1,4-diol containing at least about 3% of formaldehyde impurity by weight of said butynediol comprising admixing said aqueous solution with an amount of an alkaline substance selected from the group consisting of alkali metal hydroxides and alkaline earth metal hydroxides less than about 0.25 mole per mole of formaldehyde impurity but sufficient to yield a pH within the range of about 7.5 to about 11 and then gradually adding more of said alkaline substance to the mixture at a temperature of about 80 to 110° C. to maintain the pH within said range and until the desired reduction in formaldehyde content is obtained, the total amount of alkaline substance admixed with and added to said aqueous solution being substantially less than the amount theoretically required by the Cannizarro reaction to achieve said desired reduction in formaldehyde content.

2. A process as defined in claim 1 wherein said aqueous solution contains about 35% of 2-butyne-1,4-diol.

3. A process as defined in claim 1 wherein said alkaline substance is an alkali metal hydroxide.

References Cited by the Examiner
UNITED STATES PATENTS 2,993,078  7/1961  Hort _____ 260—637

LEON ZITVER, *Primary Examiner.*

CHARLES B. PARKER, *Examiner.*